United States Patent [19]

Neefe

[11] Patent Number: 4,701,038
[45] Date of Patent: * Oct. 20, 1987

[54] COSMETIC CONTACT LENS
[75] Inventor: Charles W. Neefe, Big Spring, Tex.
[73] Assignee: Bausch & Lomb Incorporated, Rochester, N.Y.
[*] Notice: The portion of the term of this patent subsequent to Sep. 18, 2001 has been disclaimed.
[21] Appl. No.: 682,698
[22] Filed: Dec. 17, 1984

Related U.S. Application Data

[63] Continuation-in-part of Ser. No. 497,799, May 25, 1983, abandoned, which is a continuation-in-part of Ser. No. 463,541, Mar. 14, 1983, Pat. No. 4,460,523.

[51] Int. Cl.$^4$ .......................... G02C 7/04; A61K 9/00
[52] U.S. Cl. .................................. 351/162; 604/895
[58] Field of Search ............... 351/160 H, 160 R, 161, 351/162; 604/895

[56] References Cited

U.S. PATENT DOCUMENTS 3,712,718  1/1973  LaGrand et al. ............... 351/160 R
4,121,885  10/1978  Erickson et al. ............... 351/160 H
4,472,327  9/1984  Neefe .............................. 351/162 X Primary Examiner—John K. Corbin
Assistant Examiner—Scott J. Sugarman
Attorney, Agent, or Firm—Craig E. Larson; Christopher E. Blank; Bernard D. Bogdon

[57] ABSTRACT

A cosmetic soft contact lens which alters the apparent color of the iris by employing small light reflecting particles imbedded in a colored transparent matrix.

The lens is made in the hard state from a xerogel blank having a colored pupil area surrounded by a colored iris area having imbedded light reflecting particles. A clear peripheral area is present outside the iris area. A zerogel contact lens is made from the cosmetic blank and hydrated to form a larger soft hydrogel cosmetic contact lens.

The cosmetic contact lens serves a dual purpose to correct the visual errors and change the apparent color of the eye. The natural iris pattern is visible through the lens providing a natural appearance.

16 Claims, 6 Drawing Figures

COSMETIC CONTACT LENS

This is a continuation in part of application no. 497,799 filed May 25, 1983, now abandoned, entitled: "A COSMETIC CONTACT LENS" which is a continuation in part of application no. 463,541, filed Mar. 14, 1983 entitled; METHOD OF MAKING COSMETIC CONTACT LENSES" which is now U.S. Pat. No. 4,460,523.

PRIOR ART

Several lens types have been produced in an effort to achieve an apparent color change of the eye.

An early attempt employed a laminated structure with a painted opaque replica of the iris sandwiched between a clear and an opaque rigid plastic member. The result is a thick heavy hard lens which was difficult to fabricate and difficult to wear. A later attempt employed a colored opaque porous member surrounding a clear cylinder from which a hard lens was cut by lathing. This resulted in a hard rigid lens having a pupil and iris pattern and the porous member has the tendencies to flake and chip at the edge. (U.S. Pat. No. 3,454,332 - Siegel) A third generation of colored lenses provided a thin layer of colored opaque markings placed in a clear material and centered between the front and rear lens surface. The opaque colored striation radiated from the center of the clear material around the pupil in a geometric pattern. (U.S. Pat. No. 3,712,718 - LeGrand) Siegel and LeGrand's process cannot be used for soft lenses due to the expansion in size required for hydration of soft lenses.

The present invention has the following advantages over the previous lenses: The entire lens area is transparent or semi-transparent providing peripheral vision and allowing the natural iris pattern to be visible through the lens.

It is commonly known that any transparent conventional colored contact lens placed on a dark colored iris has little or no effect toward changing the apparent color of the eye. We have discovered that if a small amount of a light reflecting finely divided particle such as finely grounded oyster shell, titanium oxide (Ti O$_2$) crystals, zinc oxide crystals or mica is placed in a matrix of transparent colored lens material of a substantially lower refractive index, the reflected light will have the color of the lower refractive index media. We have also discovered that if a colored transparent central pupil area is provided, the lens will have a natural appearance when in place on the eye and bathed in tears. As the light entering the transparent colored pupil area will enter the eye and be absorbed and give a dark natural appearance to the pupil area. The peripheral semi-transparent area transmits from 50 to 90 percent of the light as compared to the transparent colored central pupil area, therefore, 10 to 50 percent of the available light is reflected by the imbedded particles and the reflected light has the color of the transparent matrix surrounding the reflecting particles. Peripheral vision is also undisturbed. The macular area is responsible for the high performance visual acuity, however, the peripheral area of the retina is more sensitive to lower levels of illumination. Therefore, any loss of light in the peripheral area is not apparent to the wearer provided the transparent pupil area and semi-transparent peripheral area are the same color. A clear pupil surrounded by a blue periphery will produce a distracting blue color in the peripheral fields. This is due to color comparison between central and peripheral fields. This has been a problem with earlier attempts to make cosmetic contact lenses and is overcome by adding the transparent color to the pupil area.

IN THE DRAWINGS

THE LENSES ARE MADE AS FOLLOWS

Figure 1:
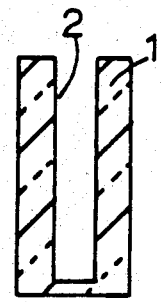
FIG. 1 shows the open top cylinder in section.

Hydrophilic, gas permeable or conventional hard lenses may be made by the following method:

The selected monomeric material, such as hydroxyethylmethacrylate and a suitable catalyst, such as benzoyl peroxide to achieve polymerization are used. Transparent pigments or a dye of the selected color, such as F. D. and C green, Number 6, and the preselected amount of the reflecting particles are added to the monomer before polymerization and cast in the form of an open top cylinderical 1 FIG. 1 having an inner hold 2 FIG. 1 the diameter of the intended pupil in the lens. The light reflecting particles are selected having a preferred particle size of from 0.1 micron to 20 micron. An increase in the quantity of reflecting particles will provide an increase in the apparent color change provided and a reduction in the visibility through the color change segment of the lens. The light reflecting particles are present in amounts ranging from 0.1% to 5% by weight and distributed evenly in the lens blank from the front surface to the rear surface. This feature provides base ease in fabricating the lens.

Typical formulations are as follows:

EXAMPLE I

| | |
|---|---|
| Hydroxyethylmethacrylate | 100 g. |
| Ethylene dimethacrylate crosslinker | .02 g. |
| Benzoyl Peroxide | 30 mg. |
| F. D. and C Green, Number 6 | 20 mg. |
| Titanium dioxide (TiO$_2$) | 35 mg. |

Hydroxyethylmethacrylate obtained from Rohm Haas.
Ethylene dimethacrylate crosslinker obtained from Eastman Chemical.
Benzoyl Peroxide obtained from East Chemical.
F. D. and C green obtained from Leeben Color and Chemical.
Titanium dioxide obtained from Aldrich Chemical.

EXAMPLE II

A soft contact lens blank is prepared by casting the following mixture. (percent by weight)

| | |
|---|---|
| (1) Ethylene glycol monomethacrylate | 92% |
| (2) Diethylene glycol monomethacrylate | 3.0% |
| (3) Methacrylic Acid | 4.0% |
| (4) Intraplast blue 2GLN | .25% |
| (5) Finely ground oyster shells | .5% |

(1) = Basic hydrophilic monomer (Rohm Haas)
(2) = Crosslinking Agent (Monomer Polymer Lab)
(3) = Hydrating Agent (Eastman Chemical)
(4) = Colorant (Compton and Knowles)
(5) = Reflecting Media (Prepared in house)

The ingredients are thoroughly mixed in the order given.

EXAMPLE III

| | |
|---|---|
| (1) Ethylene glycol monomethacrylate | 92% |
| (2) 1,4 Cyclohexanedimethyl 1,4 Dimethacrylate | 2.5% |
| (3) Methacrylic Acid | 4.5% |
| (4) LS 597 Brown Colorant | .3% |
| (5) Zinc Oxide | .45% |
| (6) 2,5 Dimethyl-2,5-bis(2 ethyl hexoyl peroxy) hexane | .25% |

(1) = Hydrogel monomer (Rohm Haas)
(2) = Crosslinker (Monomer Polymer Lab)
(3) = Methacrylic Acid (Eastman Chemical)
(4) = Colorant (Leeben Color and Chemical)
(5) = Reflecting particles (Aldrich Chemical)
(6) = Initiator (Witco)

The ingredients are mixed in the order given.

Figure 2:
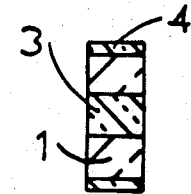
FIG. 2 shows the lens blank from the side in section.
Figure 3:
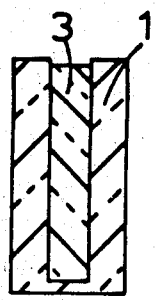
FIG. 3 shows the open top cylinder filled with colored transparent material in section.
Figure 4:
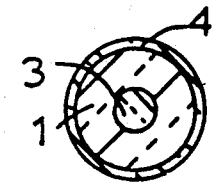
FIG. 4 shows the blank from the front in section.
Figure 5:
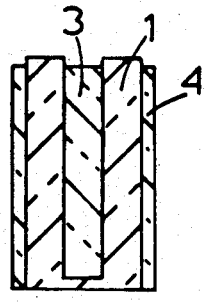
FIG. 5 shows the cylinder in section.

A mixture of the selected monomer and colorant 3 FIG. 3 to which a suitable catalyst has been added is placed in the cylinder 1 FIG. 3 and allowed to polymerize. A third, clear casting 4 FIG. 5 is made from the selected monomer to which the suitable catalyst has been added and allowed to polymerize around the cylinder, 1 FIG. 5. The cylinder is cut into discs having a transparent colored center 1 FIG. 2, a side view in section, 1 FIG. 4, a front view in section and surrounded by a colored segment having light reflecting particles imbedded in a colored transparent matrix 3 FIG. 2 and FIG. 4. The peripheral segment 4 FIGS. 2 and 4 is composed of clear transparent material. Contact lenses are cut from these discs by methods well known to the art. The finished xerogel lens is then hydrated for 4 hours with agitation in normal saline at 80° C. to provide the hydrogel lens.

Figure 6:
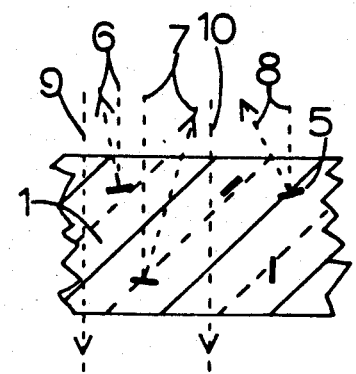
FIG. 6 shows the light reflecting particles imbedded in the transparent colored matrix.

The light reflecting particles 5 FIG. 6 which have no color of their own are imbedded in a transparent colored polymer 1 FIG. 6. Light rays 9 and 10 FIG. 6 not reaching one of the reflecting particles passes through the lens as colored light. The light rays 6, 7 and 8 FIG. 6 imperging on the surface of the reflecting particles are reflected forward from the front of the lens as colored light. The eye takes on the apparent color of the reflected light. These lenses may be used as cosmetics for adding color to the eye for special events or for wear with special clothing, therefore, they may not be worn every day, but kept in storage for long periods of time. This fact brings out the problem of sanitation in storage and use. To overcome this problem, antimicrobial agents must be used either in the storage solutions or incorporated in the lens material.

The above method of manufacture is useful in the production of soft contact lenses. Soft lenses are machined in the hard, dry or xerogel state and hydrated to form soft hydrogel lenses. Expansion in size occurs during hydration. This increase in size prohibits the use of laminated construction or imbedded striations which cannot expand at exactly the same degree as all other parts of the lens. Small differences of only 0.1% will result in distorted optics and an unusable lens. The expansion and refractive index change factors for different water content materials are as follows:

| | |
|---|---|
| Dry Reflective Index | 40% water = 1.520 |
| | 50% water = 1.525 |
| | 60% water = 1.530 |
| Power Shift Dry to Wet | 40% water dry × .734 |
| | 50% water dry × .714 |
| | 60% water dry × .588 |
| Expansion Diameter Dry to Wet | 40% water dry × 1.225 |
| | 50% water dry × 1.30 |
| | 60% water dry × 1.40 |

Methods that are usable in hard lenses may not be useful in soft lenses due to the expansion requirement.

Laminated lenses or lenses having paints or opaque images which cannot freely expand when hydrated will result in surface distortion which will destroy the optical quality of the lens. The expansion from dry to wet must result in a predictable and uniform curvature if the lens is to be worn with comfort and good vision. Any inclusions which restrict or accelerate the expansion are not acceptable for hydrogel lenses.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

I claim:

1. A soft hydrophilic cosmetic contact lens that alters the apparent color of the eye made from a hard xerogel cosmetic contact lens blank having a central transparent colored pupil shaped area surrounded by a semi-transparent colored iris shaped area said iris shaped area having a plurality of evenly distributed light reflecting particles having a size from 0.1 microns to 20 microns which reflect from 10 percent to 50 percent of the light entering the iris shaped area and a clear peripheral area surrounding the colored semi-transparent iris shaped area, a xerogel cosmetic contact lens is made from the xerogel cosmetic contact lens blank and when hydrated the hard xerogel cosmetic contact lens increases uniformly in size to form a soft hydrogel cosmetic contact lens which will alter the apparent color of the eye upon which it is placed.

2. A soft contact lens as in claim 1 wherein the reflected light has the color of the transparent colored material surrounding the reflecting particles.

3. A cosmetic contact lens as in claim 1 wherein 50 percent to 90 percent of the light entering the iris area is transmitted through the lens.

4. A cosmetic contact lens as in claim 1 wherein the light reflecting particles are present in amounts ranging from 0.1% to 5% by weight.

5. A cosmetic contact lens as in claim 1 wherein the reflecting particles are zinc oxide.

6. A cosmetic contact lens as in claim 1 wherein the reflecting particles are titanium dioxide ($TiO_2$).

7. A cosmetic contact lens as in claim 1 wherein an antimicrobial agent is incorporated in the lens material.

8. A cosmetic lens as in claim 1 wherein the wearer has peripheral vision through the intermediate area of the lens.

9. A cosmetic lens as in claim 7 wherein the wearer has peripheral vision through the iris area of the lens.

10. A cosmetic contact lens as in claim 1 wherein the wearers natural iris of the eye is visible through the iris area of the lens.

11. A cosmetic contact lens as in claim 7 wherein the wearers natural iris of the eye is visible through the iris area of the lens.

12. A soft hydrophilic cosmetic contact lens which changes the apparent color of the eye upon which it is worn, made from a xerogel cosmetic contact lens blank, comprising a first cicrular transparent colored central pupil area substantially the size and shape of the natural pupil, surrounded by a second circular semi-transparent iris area substantially the size and shape of the natural iris, said semi-transparent iris area being composed of a transparent colored xerogel material having a plurality of light reflecting particles having a size from 0.1 microns to 20 microns dispersed within the transparent colored iris area material whereby 10 to 50 percent of the light entering the iris shaped area is reflected from the lens by the reflecting particles and the reflected light will be of the same color as the transparent colored iris material surrounding the reflecting particles and a clear peripheral area surrounding the colored semi-transparent iris shaped area, the xerogel cosmetic contact lens is made from the xerogel cosmetic contact lens blank and the xerogel cosmetic contact lens is hydrated and increases uniformly in size and curvature to form a soft hydrogel cosmetic contact lens which changes the apparent color of the eye upon which it is worn.

13. A contact lens which changes the apparent color of the eye upon which it is worn, comprising a transparent central pupil area surrounded by a semi-transparent area, said latter area comprising a transparent colored material having light reflecting particles evenly distributed therein.

14. A contact lens according to claim 13 wherein the light reflecting particles have a size from 0.1 to 20 microns and reflect from 10 to 50 percent of the light in the semi-transparent area.

15. A contact lens according to claim 13 wherein the transparent central pupil area and the surrounding semi-transparent area are of the same color.

16. A contact lens according to claim 15 wherein a clear peripheral area surrounds the semi-transparent area.

* * * * *